May 13, 1930.  G. W. STOCKTON  1,758,132
DITCHING MACHINE
Filed March 26, 1927   3 Sheets-Sheet 1
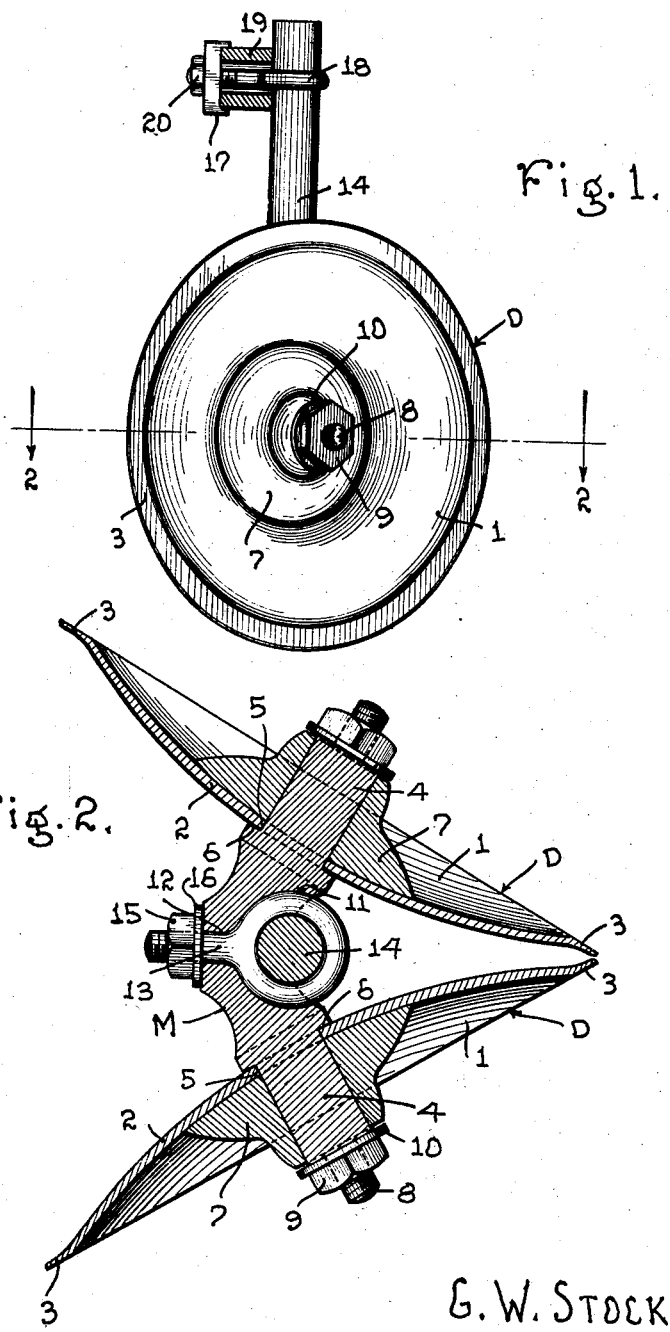
Inventor
G. W. STOCKTON.
By Sol Shappirio
Attorney May 13, 1930.  G. W. STOCKTON  1,758,132
DITCHING MACHINE
Filed March 26, 1927   3 Sheets-Sheet 2

Inventor
G. W. STOCKTON.
Sol Shappirio
Attorney

May 13, 1930.　　　G. W. STOCKTON　　　1,758,132
DITCHING MACHINE
Filed March 26, 1927　　　3 Sheets-Sheet 3
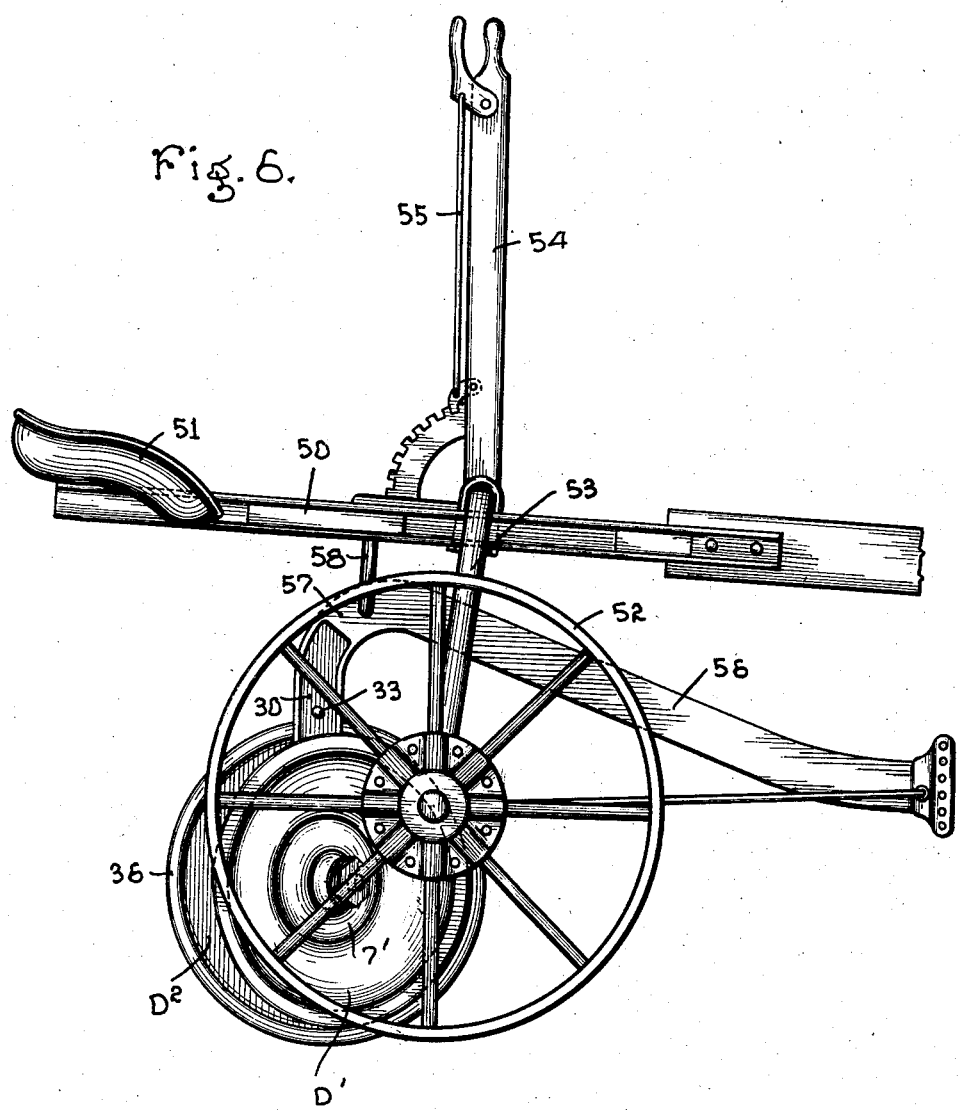

Patented May 13, 1930

1,758,132

UNITED STATES PATENT OFFICE

GEORGE W. STOCKTON, OF DENVER, COLORADO, ASSIGNOR TO J. N. HUFF, OF DENVER, COLORADO

DITCHING MACHINE

Application filed March 26, 1927. Serial No. 178,641.

This invention relates to ditching machines and more particularly to such machines in which cutting discs are used for plowing ditches, for irrigation or other purposes.

While a number of machines are known in the art for making ditches, they are open to a number of objections, among which it may be noted that some machines in use will not satisfactorily ditch ground that is too hard, that the known machines require great expenditure of power in their work, and with some of them there is injury to crops.

One of the objects of this invention is a ditcher of simple construction which lends itself to economical operation. A further object of this invention is the production of a ditching machine that may be used for cutting ditches in any type of ground with a minimum expenditure of power and a consequent increase in capacity.

A still further object of the invention is a ditching machine in which there is little danger of injury to crops.

Still further objects and advantages will appear from the more detailed description set forth below, taken in connection with the accompanying drawings, but it is understood that this more detailed description is given by way of illustration and not by way of limitation, since various changes may be made in the construction by those skilled in the art, without departing from the scope and spirit of this invention.

Figure 3:
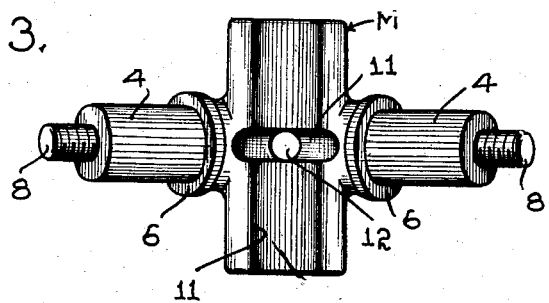
Figure 4:
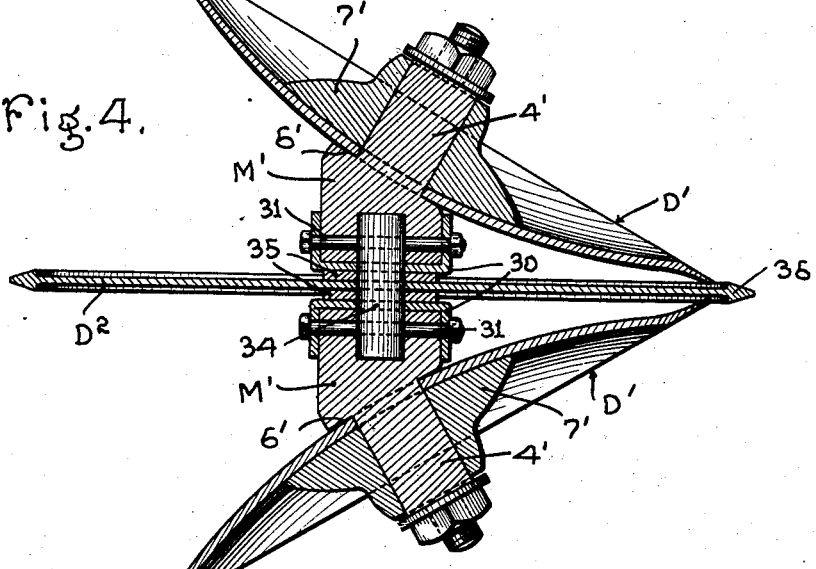
Figure 5:
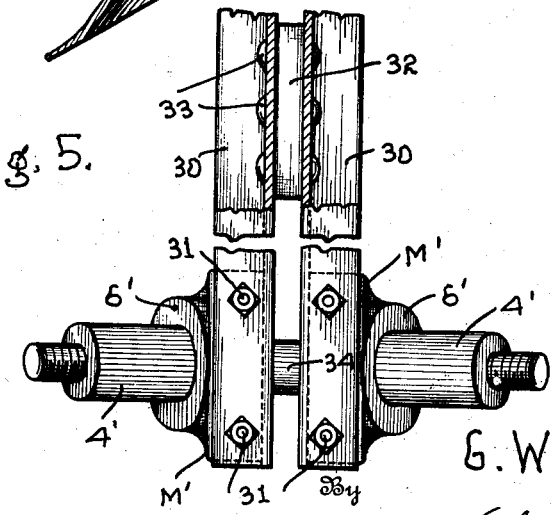

In the drawings accompanying this more detailed description, there is shown by way of illustration in Figure 1, a side elevation showing the discs mounted in position on a tool holder; in Figure 2, a section taken on line 2, 2 of Figure 1, showing the discs carried on the mounting in place on the tool holder; in Figure 3, a detail of the mounting on which the discs are carried; in Figure 4, a sectional view similar to Figure 2, showing the auxiliary disc mounted between the two principal discs; in Figure 5, a detail partly in section, of the mounting for the discs of Figure 4; and in Figure 6, a general view of the structure, using the arrangement of discs shown in Figure 4.

From the drawings it is thus seen that the ditching machine includes cutting discs angularly disposed with respect to each other, and desirably having the nearest point of approach of these cutting discs toward the front of the machine, that is, in the direction of travel. These cutting discs may be supplemented with an auxiliary cutting disc mounted between the principal discs and cooperating therewith.

Turning to the more specific form shown in Figures 1 to 3 of the drawings, discs D, desirably of concavo-convex form, shown at 1, 2, in Figures 1 and 2 of the drawings, are also desirably provided with an annular flange 3, forming the outer rim of these cutting discs. The discs are mounted for rotation on the mounting M, desirably a casting. This substantially V-shaped mounting is provided with arms 4, 4, desirably integral with the mounting. The discs D, D, provided with a central opening 5, are mounted on these arms and rest against the abutment or shoulder 6, against which they are held by substantially bell-shaped bearings 7, 7. The ends of these arms 4, 4 are reduced in size to form threaded members 8, 8, on which the usual nuts 9, 9 and washers 10, 10 are placed to hold the bearings 7, 7 and discs D, D in position on the mounting. In order to provide for carriage of these discs on the ditching machine, the mounting M is recessed as shown at 11, the recess being substantially transverse of the main portion of the casting and centrally located therein. An opening 12 extends from the recess 11 through the mounting and is adapted to receive a ring bolt 13, the ring of which rests upon the recess 11. The tool holder 14 extends through the eye of the ring bolt 13, the mounting being rigidly held in place by means of the nut 15, secured into position on the threaded portion of the ring bolt. The washer 16 may be interposed between the mounting and the nut 15. The tool holder 14 is carried in the usual manner on the tool rail 17, of any standard cultivator, by means of ring bolt 18, spacing member or collar 19 and the nut 20, for holding these parts in their proper position.

In the modification shown in Figures 4 and 5 of the drawings, the discs D', D' are mounted in a similar manner, the mounting therefor comprising two preferably cast portions M', M', having arms 4', 4', bearings 7', 7', adapted to hold the discs D', D' on the arms and against the shoulders 6', 6' of the mountings M', M'. The castings M', M' are carried on channel irons 30, 30 by means of bolts 31, 31, the channel irons being spaced apart by a spacing member or casting 32, riveted as shown at 33 to the channel irons. A shaft 34 carried in the mountings M', M' extends transversely through the space between the channel irons and forms the shaft on which the auxiliary disc $D^2$ revolves. Bushings 35, 35 are interposed between the channel irons and the auxiliary disc $D^2$. The mountings M', M' are provided with recesses adapted to receive the said shaft 34. The outer edge of the auxiliary disc $D^2$ is desirably provided with a shoulder 36 formed as a cutting edge. As shown in Figure 4, the auxiliary disc $D^2$ revolves on shaft 34 within the space between the principal discs D', D' and approaches nearest to these discs D', D', angularly disposed with respect to each other, at the nearest point of approach of said discs.

As shown in the assembled device in Figure 6, the modified form of the cutting disc arrangement illustrated in Figures 4 and 5 is mounted on a suitable frame 50, provided with a driver's seat 51 at the rear of said frame. The frame 50 is supported on wheels 52 in any conventional manner. Rod 53, lever 54 and release 55 are the usual attachments on such machines for depressing the cutting discs and their mountings whereby the depth of the ditch cut may be determined and regulated. The channel iron 30 carrying the cutting discs is mounted on the tongue 56, at its rearwardly extending portion 57, the tongue 56 thus forming a tool holder for the cutting discs. The tongue 56 is supported from the frame by braces 58. The frame 1 may be provided at its forward end, not shown in the drawing, with means whereby it may be pulled along the ground to be ditched.

The cutting discs and mounting shown in Figures 1–3 may be mounted in a similar manner on the tool rail of any standard cultivator.

The operation of the device will be understood from the description set forth above. A cultivator having the cutting discs mounted thereon in any manner as set forth above, is drawn over the ground in which a ditch is to be cut. As the machine progresses, the principal discs D, D or D', D' will cut into the ground thus forming a ditch. When the modified form of the device is used, the auxiliary disc cooperates with the main or principal discs in cutting the ditch. The cutting attachment shown will ditch ground that is too hard to be satisfactorily ditched by other models, and will also involve a considerably less expenditure of power, whereby the operator is enabled to cover more ground per day. The flange on the edge of the disc lessens the danger of injury to crops, such as sugar beets, artichokes, potatoes, celery, etc. A machine provided with the cutting discs herein above set forth finds wide utility in plowing, ditching, irrigating, ridging and cultivating lands used for raising wheat, rye, oats, corn, small grains in general, and vegetables of all kinds, including those mentioned above. If desired, the cutting discs may be used in conjunction with a plow or wings following the same to remove the center ridge formed by the cutting discs, or to remove or pack any loose soil left by the discs.

While as shown herein the principal discs D, D and D', D' are preferably placed side by side, although angularly disposed, with respect to each other, the discs may be so carried on the mounting that one follows the other. And further, while the mountings have been described as castings, they may be made in any other desirable way. Again, while it is desirable to have the angularly disposed discs with their nearest point of approach in the direction of travel, this is not an absolutely essential limitation, since these discs may take other angular positions with respect to each other.

Having thus set forth my invention, I claim:

1. In a ditching machine, a mounting for cutting discs carried on said machine, said mounting having angularly disposed arms for supporting cutting discs, cutting discs on said arms and adapted to rotate thereon, said discs being angularly disposed with respect to each other, and a vertically disposed auxiliary disc mounted between the angularly disposed discs and cooperating therewith.

2. In a ditching machine, a pair of channel irons, a mounting supported on each channel iron, the mounting carrying disc supporting arms, the arms being angularly disposed with respect to one another, principal cutting discs mounted on the disc supporting arms, a shaft carried by said mounting transversely of the space between the channel irons, and an auxiliary cutting disc mounted on said shaft and adapted to rotate thereon in the space between the channel irons, the outer rim of the auxiliary disc extending adjacent to but beyond the point of nearest approach of the principal discs to each other.

G. W. STOCKTON.